3,140,282
PROCESS FOR THE PRODUCTION OF
α-AMINOBENZYLPENICILLINS
David A. Johnson, Fayetteville, N.Y., and Saul Wolfe,
Kingston, Ontario, Canada, assignors to Bristol-Myers
Company, New York, N.Y., a corporation of Delaware
No Drawing. Filed Mar. 5, 1962 Ser. No. 177,235
7 Claims. (Cl. 260—239.1)

This invention relates to a process for the preparation of α-aminophenylmethylpenicillin and α-amino-substituted-phenylmethylpenicillins and, more particularly, to a chemical process for the production of α-aminobenzylpenicillin and related ring-substituted compounds.

This application is a continuation-in-part of our prior, copending application S.N. 169,657, filed January 29, 1962, now abandoned.

α-Aminobenzylpenicillin is a compound which is known in the technical literature, having been described for example in United States Patent No. 2,985,648. The preparation of α-aminobenzylpenicillin as described in that patent involves the preparation of α-aminophenylacetic acid, the reaction of that acid so as to protect the amino group, e.g., as with benzoxycarbonyl chloride to form α-carbobenzyloxyaminophenylacetic acid, the formation of a mixed anhydride of that compound, the reaction of the mixed anhydride with 6-aminopenicillanic acid, the subsequent removal of the protecting group from the amino group by hydrogenolysis and finally the purification of the product. Such a method has been found to be very difficult to carry out on a commercial scale and, moreover, has the disadvantage of being very costly, particularly in the hydrogenolysis step which requires substantial amounts of hydrogenation catalyst.

The invention is therefore broadly directed to an improved method for the preparation of α-aminoarylmethylpenicillins. The invention is specifically directed to an improved method for the preparation of α-aminobenzylpenicillins. It is a general object of the invention to provide a process for the preparation of an α-aminoarylmethylpenicillin comprising the reaction of 6-aminopenicillanic acid and a 2-amino-2-arylacetyl chloride hydrochloride. It is a particular object of the invention to provide a commercially useful method by which 6-aminopenicillanic acid may be reacted with 2-phenylglycyl chloride hydrochloride to produce α-aminobenzylpenicillin and either of the diastereoisomers thereof in high yields substantially free of contaminants with a minimum of manipulative operations. Other objects and advantages of the invention will become apparent in the following detailed description and illustration of the invention.

Beginning with the work of Emil Fischer (Synthese von Polypeptiden, XIII. Chloride der Aminosauren und Polypeptide und ihre Verwendung zur Synthese, Ber. deut. chem. Ges., 38(3), 2914–2925, 1905) the chloride hydrochlorides of amino acids have been known to react so readily with water that both chlorine atoms were converted to chloride ions immediately on contact with cold water and were then easily titrated with silver nitrate for analytical purposes. These chloride hydrochlorides of amino acids could be used to form peptides only if reacted both under absolutely anhydrous conditions and with other amino acids in which the carboxyl group had been protected, as by esterification. This in turn necessitated later saponification at elevated temperatures.

In view of the extremely rapid hydrolysis of 2-phenylglycyl chloride hydrochlorides by water, it was most surprising to find, according to the present invention, that they can be reacted with 6-aminopenicillanic acid to produce high yields of an α-aminobenzylpenicillin in either pure water or in an aqueous liquid medium.

Accordingly, the objectives of the present invention have been achieved by the provision, according to the present invention, of a process for the production of an α-aminobenzylpenicillin which comprises mixing about 1.0 to 3.0 moles (per mole of 6-aminopenicillanic acid) of a 2-phenylglycyl chloride hydrochloride selected from the group consisting of those compounds having the formula

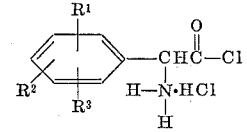

wherein $R^1$, $R^2$ and $R^3$ are each members selected from the group consisting of hydrogen, nitro, di(lower)alkylamino, acylamino [where the acylating agent is an aliphatic carboxylic acid containing from 1 to 10 carbon atoms inclusive and the substituent may thus be named (lower)alkanoylamino], (lower)alkyl, fluoro, chloro, bromo, iodo, (lower)alkoxy, (lower)alkylthio, (lower)-alkylsulfonyl, sulfamyl, benzyl, phenethyl, cycloheptyl, cyclohexyl, cyclopentyl and trifluoromethyl and 6-aminopenicillanic acid in an aqueous medium maintained at about −50° C. to +20° C. and at a highly acidic pH to produce a solution of the corresponding α-aminobenzylpenicillin selected from the group consisting of those compounds having the formula

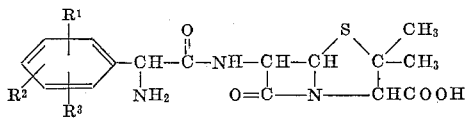

wherein $R^1$, $R^2$ and $R^3$ have the meaning set forth above; and, more specifically, of a process for the production of an α-aminobenzylpenicillin which comprises the consecutive steps of mixing about 1.0 to 3.0 moles (per mole of 6-aminopenicillanic acid) of a 2-phenylglycyl chloride disclosed above and 6-aminopenicillanic acid in an aqueous medium maintained at about −50° C. to +20° C. and at a highly acidic pH to produce a solution of the corresponding α-aminobenzylpenicillin, raising the pH of said solution to at least about pH 4, and removing any solids present from said solution to produce an aqueous solution of said α-aminobenzylpenicillin; and, even more specifically, of a process for the production of an α-aminobenzylpenicillin which comprises the consecutive steps of adding in small increments about 1.0 to 1.5 moles (per mole of 6-aminopenicillanic acid) of a 2-phenylglycyl chloride hydrochloride disclosed above to an aqueous solution of 6-aminopenicillanic acid maintained at about −10° C. to +10° C. and at about pH 1.5-5.5 to produce a solution of the corresponding α-aminobenzylpenicillin, raising the pH of said solution to at least about pH 6, and removing any solids present from said solution to produce an aqueous solution of said α-aminobenzylpenicillin; and, most specifically, of a process for the production of an α-aminobenzylpenicillin which comprises the consecutive steps of adding in small increments about 1.0 to 1.5 moles (per mole of 6-aminopenicillanic acid) of a 2-phenylglycyl chloride hydrochloride disclosed above to a solution in aqueous acetone (or aqueous tetrahydrofuran) of 6-aminopenicillanic acid maintained at about 0° C. and at about pH 2-3 to produce a solution of the corresponding α-aminobenzylpenicillin, removing a substantial proportion of the acetone (or tetrahydrofuran) from said solution by distillation in vacuo at about pH 5 to leave an aqueous concentrate, adjusting the pH of said concentrate to about pH 7, filtering said concentrate to produce an aqueous solution of said α-aminobenzylpenicillin and recovering said α-aminobenzylpenicillin therefrom.

In the preferred embodiments of the present invention, $R^1$ is hydrogen or chloro and $R^2$ and $R^3$ are hydrogen, and, most particularly, the 2-phenylglycyl chloride hydrochloride is D(—)-2-phenylglycyl chloride hydrochloride.

The term "alkyl" as used herein refers to straight and branched chain saturated aliphatic hydrocarbon groups having from 1 to 20 carbon atoms inclusive, e.g., methyl, ethyl, propyl, isopropyl, butyl, isobutyl, amyl, hexyl, lauryl, octadecyl, tetradecyl, hexadecyl, etc. The term "(lower)alkyl" groups refers to alkyl groups having from 1 to 6 carbon atoms inclusive.

Each of the penicillins prepared by the process of this invention can readily be converted to form the carboxylic acid salts, e.g., the nontoxic metallic salts such as sodium, potassium, calcium, aluminum and ammonium salts and their nontoxic substituted ammonium salts with an amine selected from the group consisting of trialkylamines, procaine, dibenzylamine, N-benzyl-beta-phenethylamine, 1-ephenamine, N,N'-dibenzylethylenediamine, dehydroabietylamine, N,N'-bis-dehydroabietylethylenediamine and N-(lower)alkylpiperidines, e.g., N-ethylpiperidine.

The temperature at which the reaction of this invention is carried out can be varied widely, e.g., with a range of about —50° to +20° C. It is preferred to carry out the reaction at about from —20° C. to 0° C. The reaction period can also be varied widely, e.g., over a period of from about 1 to 120 minutes. A preferred time of reaction is from about 20 to 60 minutes depending principally upon the quantity of reactants.

To obtain the maximum yield, it is advantageous but not essential, to add to the aqueous solution of 6-aminopenicillanic acid amounts of an inorganic chloride, e.g., sodium chloride, calcium chloride, up to saturation. It is likewise advantageous but not essential to use in the aqueous reaction medium a water-soluble organic solvent which preferably does not react with an acid chloride hydrochloride, e.g., acetone in an amount equal to about 20–90% of the final volume. Other such solvents include dioxane and tetrahydrofuran, with preference given to volatile solvents which can be easily removed by distillation, as in vacuo, at the end of the reaction. These measures are of particular value when it is desired to conduct the reaction at or below 0° C. Acetone and tetrahydrofuran are preferred for the highest yields but lower aliphatic alcohols, dioxane and similar solvents may be used, as determined by simple test. Thus the aqueous reaction medium of the present invention includes mixtures of acetone and water in which the content of acetone is a high as 90%.

The solid 2-phenylglycyl chloride hydrochloride is preferably added in frequent small portions, e.g., in 10 to 100 equal portions sprinkled over the surface or otherwise widely dispersed, to the solution of 6-aminopenicillanic acid in the substantially aqueous reaction medium. As this is a heterogeneous reaction, it is preferred, *but by no means essential,* that the particles of 2-phenylglycyl chloride hydrochloride be of small size, e.g., 200 mesh or micronized, that is, of less than 5 microns diameter on the average. If desired, however, the 2-phenylglycyl chloride hydrochloride may be added intermittently or as a continuous stream as a slurry, e.g., in dry acetone or similar anhydrous, unreactive, water-soluble organic solvent, or as a solution in a similar solvent, e.g., dimethylacetamide or any other in which the 2-phenylglycine chloride hydrochloride is highly soluble. In the latter case, the amount of dimethylacetamide is kept to a minimum because it tends to interfere with the recovery of the final product.

The reaction of the present invention of a 2-phenylglycyl chloride hydrochloride with 6-aminopenicillanic acid is not conducted, as would be expected, at the alkaline pH characteristic of the Schotten-Baumann reaction. It must be conducted at an acidic pH to obtain any yield at all of the desired α-aminobenzyl-penicillin; the pH is therefore maintained in the range of 1.5–5.5 and preferably at pH 1.5–3.0. The pH is controlled, if necessary, by the usual techniques, e.g., by the addition of aqueous sodium hydroxide or of triethylamine.

It is advantageous but not essential to use an amount of the 2-phenylglycyl chloride hydrochloride at least stoichiometrically equal to the 6-aminopenicillanic acid; thus, per mole of 6-aminopenicillanic acid, use is made of 1.0–3.0 moles, but preferably 1.0–1.5 moles, or better yet 1.0–1.1 moles, of the 2-phenylglycyl chloride hydrochloride.

The pH values described herein were measured directly by electrode immersion in the usual manner, whether the liquid was purely aqueous or a mixture of water and an organic solvent such as acetone.

At the conclusion of the reaction, the product, an amphoteric penicillin, is recovered by the "carrier" processes disclosed for use with 6-aminopenicillanic acid in British complete specifications 882,276 and 882,277, published November 15, 1961, and in United States Patent 3,008,955. In brief, these processes comprise a process for the recovery of the amphoteric α-aminobenzylpenicillin from aqueous solutions thereof which comprises extracting the aqueous solution at a pH of between 1 and 3 with a lesser volume of a water-immiscible organic solvent having dissolved therein between 0.5% and 10% by weight of said aqueous solution of a compound of the general formula $$(R^1SO_3)_xM$$

wherein $R^1$ is a hydrocarbon radical having a molecular weight between 340 and 510, M is a hydrogen, alkali metal or alkaline earth metal atom and $x$ is the valency of M or a mixture of such compounds, and separating the organic solvent phase containing the major portion of the amphoteric α-aminobenzylpenicillin and a process for the recovery of the amphoteric α-aminobenzylpenicillin from aqueous solutions thereof which comprises extracting the aqueous solution at a pH of between 1 and 3 with a lesser volume of a water-immiscible organic solvent having dissolved therein between 0.5% and 10% by weight of said aqueous solution of a compound of the general formula $$R^2OOCCHCH_2COOR^3$$
$$|$$
$$SO_3M$$

wherein $R^2$ and $R^3$ are each lower alkyl groups containing from 7 to 11 carbon atoms and M is a hydrogen atom or an alkali metal radical, and separating the organic solvent phase containing the major portion of the amphoteric α-aminobenzylpenicillin. The product is then isolated as a pure solid from the aforesaid organic solvent phase in various ways, e.g., by direct precipitation of an alkali metal salt as formed by adding sufficient sodium or potassium 2-ethylhexanoate, for example, by direct precipitation of the penicillin in its amphoteric or switterion form by addition of a base such as sodium hydroxide or triethylamine, e.g., until the pH is about 5.6 as measured by shaking a sample in water, or by back-extraction into a small volume of water at a pH of about 5 to 8, and preferably 6.5–7.0, followed by isolation therefrom of the solid product, as by lyophilization or by precipitation after adjustment of the pH to about 4–5.

Prior to extracting the product from the aqueous reaction medium into the solvent phase by one of the aforementioned "carrier" processes, it is advantageous but not essential to remove a large proportion of the diluent, e.g., acetone, as by distillation in vacuo at about pH 5 and to remove contaminants and color bodies by extracting the aqueous reaction mixture at a highly acid pH, e.g., pH 2, with a water-immiscible organic solvent, e.g., methyl isobutyl ketone. In addition, filtration may be used to remove any contaminants which precipitate from the aqueous reaction mixture before or after the concentration step described above.

In the products of the present process, the α-carbon atom of the acyl group (to which the α-amino group is attached) is an asymmetric carbon atom and these products can therefore exist in two optically active isomeric forms [the D(−) and L(+) diastereoisomers], as well as in the optically inactive DL form which is a mixture of the two optically active forms; all such isomeric forms are produced by the use in the process of the present invention of the appropriate form of the 2-phenylglycyl chloride hydrochloride as the starting material. These starting materials are prepared as set forth in the literature and particularly in United States Patent 2,985,648.

The preferred reagent of the present invention is 2-phenylglycine chloride hydrochloride, also called 2-phenylglycyl chloride hydrochloride.

PREPARATION OF 2-PHENYLGLYCYL CHLORIDE HYDROCHLORIDE

*Run No. I.*—D(−)-2-phenylglycine (25.0 gm.; 0.165 mole; $[\alpha]_D = -153°$) is suspended in 500 ml. methylene dichloride and phosphorus pentachloride (63.0 gm.; 0.30 mole) is added to the suspension at 3° C. After 10 minutes, 2 ml. of dimethylformamide is added to the reaction mixture which is then stirred for 10 minutes in an ice-bath and thereafter for 2 hours at room temperature. The resulting product, 2-phenylglycyl chloride hydrochloride, is collected by filtration, washed with methylene dichloride and ether, dried in vacuo over $P_2O_5$ for 2 hours and thereafter found to weigh 19.6 gms.

*Run No. II.*—A suspension of dry DL-2-phenylglycine (10.0 gm.; 0.066 mole) in 400 ml. carbon tetrachloride is cooled to 0° C. and phosphorus pentachloride (15.0 gm.; 0.072 mole) is added thereto. The reaction mixture is stirred for 5 minutes in an ice-bath and then at room temperature for 18 hours. The product, DL-2-phenylglycyl chloride hydrochloride, is then collected by filtration, washed with dry ether, dried in vacuo over $P_2O_5$ for 3 hours and thereafter found to weigh 11.2 gm. (82% of theoretical yield). Infrared analysis discloses the product to be essentially the desired product with some contamination which appears to be 2-phenylglycine.

The following examples will illustrate the process of this invention. The invention is not limited to the illustrated embodiments which are susceptible of many variations within the scope of the appended claims.

Example 1

To 6-aminopenicillanic acid (2.16 g., 0.010 mole) dissolved in 50 ml. water containing 3 ml. 6 N $H_2SO_4$ and cooled to 0° C. there was added in one portion solid 2-phenylglycyl chloride hydrochloride (3.09 g., 0.015 mole). The temperature rose to 10° C. and a clear yellow solution was obtained. The pH was then less than 2. Stirring was continued for 20 minutes in the ice-bath and for five more minutes after removal from the ice bath. The pH was then adjusted to 4.5 by the addition of 10% NaOH. Precipitation of a solid (believed to be 2-phenylglycine) began at this point and 1.9 grams of this material was collected by filtration. The aqueous filtrate containing the α-aminobenzylpenicillin was then evaporated to dryness to give 4.7 grams of impure α-aminobenzylpenicillin as demonstrated by paper strip chromatography.

Example 2

6-aminopenicillanic acid (1.25 g., 0.0058 mole) and 2-phenylglycyl chloride hydrochloride (3.35 g., 0.0162 mole) as solids were mixed in a dry beaker and the reaction was initiated by the addition of 50 ml. of ice-cold water. A clear solution was obtained at once. The pH was less than 2. The reaction was maintained at 0° C. for 20 minutes and then for 15 minutes more after removal of the ice-bath. The solution was then neutralized by the addition of 10% NaOH. Precipitation of a solid (believed to be 2-phenylglycine) began at pH 3.4; the solid was collected by filtration and washed with acetone and found to weigh 1.8 g. The aqueous filtrate containing the product was evaporated to dryness to give 3.25 g. impure α-aminobenzylpenicillin which was identified by paper strip chromatography.

Example 3

α-Aminophenylacetic acid (20.8 g., 0.138 mole), $PCl_5$ (42 g., 0.202 mole) and 2 ml. dimethylformamide were stirred at 0° C. for 30 minutes in 500 ml. $CH_2Cl_2$. The cooling bath was then removed and the mixture was stirred for about 2 hours, changing in this time from viscous white to a mobile yellow. The solid 2-phenylglycyl chloride hydrochloride was collected by filtration, washed with 500 ml. $CH_2Cl_2$ and then with 250 ml. ether and then after drying one hour in vacuo was found to weigh 11.8 g. (0.057 mole). This material was added all at once to a well-stirred solution maintained at 0° C. of 6-aminopenicillanic acid (3.0 g., 0.0139 mole) and 2.5 ml. of 6 N $H_2SO_4$ (15 milliequivalents) in 50 ml. water. The temperature rose from 6° to 20° C. in two minutes and then in eight minutes decreased to 8° C. A pale yellow solution resulted. After an additional 10 minutes, the solution was neutralized with NaOH and the precipitated solid (believed to be 2-phenylglycine) was collected by filtration and found to weigh (7.4 g., 0.049 mole). The aqueous filtrate was demonstrated by bioassay to contain the desired product, α-aminobenzylpenicillin.

Example 4

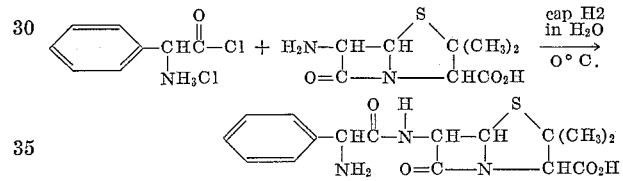

6-aminopenicillanic acid (5.0 g., 0.023 mole) was dissolved in 100 ml. water at pH 6.0. Acetone (400 ml.) was added and the solution was cooled to 0° C.

During 30 minutes, solid D(−)-2-phenylglycyl chloride hydrochloride (7.1 g., 0.035 mole) was added in about 10 portions. The temperature remained at −5° C. to −1° C. The pH dropped to 1.5 after about ½ of the D(−)-2-phenylglycyl chloride hydrochloride was added. For the remainder, the pH was maintained between 1.5–2.0 by adding aqueous NaOH. At the end of the reaction the pH was adjusted to 5.0 and the clear yellow solution (except for a small amount of flocculent precipitate removed by filtration) was concentrated in vacuo to 100 ml. volume. After concentration, the pH was 7.6 and was adjusted to 7.0, the solution was cooled to 3° C. and the yellow solid which precipitated was collected by filtration, dried (corrected M.P. 179–230° C. dec.; 1.1 g.) and discarded.

The yellow filtrate was washed at pH 2 with 25 ml. methyl isobutyl ketone which removed the yellow color and precipitated a minute amount of white solid. This mixture was passed through diatomaceous earth and the rich aqueous phase (216 ml.) was separated. The rich aqueous phase was adjusted to pH 7.0; a portion diluted 50-fold assayed 575 mcg./ml. indicating a total yield of 6.2 g. or 72%.

This aqueous phase containing the product, D(−)-α-aminobenzylpenicillin, was extracted twice at pH 2.0 with 5.5 g. bis-(2-ethylhexyl)sodium sulfosuccinate (0.0124 mole) in 110 ml. methyl isobutyl ketone each time.

The rich methyl isobutyl ketone was divided into 2 equal volumes (110 ml. each). One was adjusted to pH 5.6 with triethylamine and the other with 10% NaOH. These were stirred cold for 1.5 hours to precipitate the product, D(−)-α-aminobenzylpenicillin.

The triethylamine-neutralized rich methyl isobutyl ketone was filtered and the white prisms of D(−)-α-aminobenzylpenicillin were washed with methyl isobutyl ketone and then with mixed lower alkanes (Skellysolve B), dried and found to exhibit M.P. 198–210.5° C. dec. (corrected) and to weigh 2.6 g. (61.5% yield). The sodium hydroxide-neutralized rich methyl isobutyl ketone was also filtered and the white needles of D(—)-α-aminobenzylpenicillin were washed with methyl isobutyl ketone and then with mixed lower alkanes (Skellysolve B), dried and found to melt at 197.5–210.5° C. dec. (corrected) and to weigh 1.9 g. (45% yield).

*Example 5*

To 6-aminopenicillanic acid (10.8 g., 0.05 mole) in 200 ml. water and 1000 ml. acetone at pH 6.3 and maintained at —40° C. there was added with stirring in 2 g. increments every 5–7 minutes 21.6 g. solid D(—)-2-phenylglycyl chloride hydrochloride. After the addition of 6.0 g. of the chloride hydrochloride, there was added 2.0 ml. 4 N NaOH (to a total of 10 ml.) after each increment of chloride hydrochloride. After a total of 75 minutes stirring the temperature of the clear reaction solution was warmed rapidly to 20° C. and found to be at pH 1.1, which was adjusted to pH 2. Most of the acetone was removed by distillation in vacuo to leave an aqueous concentrate, rich in D(—)-α-aminobenzylpenicillin, which was adjusted from pH 1.1 to pH 2.1, filtered and found to have a volume of 270 ml. and to contain an 81% yield of product as determined by bioassay.

A 50 ml. portion of this rich aqueous concentrate was adjusted to pH 7.0, chilled 20 minutes, filtered and extracted at pH 2.0 with 37 ml. of a 10% solution in methyl isobutyl ketone of bis(2-ethylhexyl)sodium sulfosuccinate. The organic solvent phase containing the product was separated and its pH was adjusted to pH 4.0 with 10% NaOH. After filtering, the solution was kept on ice and its pH was slowly raised to 5.5 with 10% NaOH, causing the product, D(—)-α-aminobenzylpenicillin, to precipitate as a solid. After two hours, the product was collected by filtration, washed successively with dry methyl isobutyl ketone and lower alkanes (Skellysolve B), dried and found to weigh 1.3 g. (38% yield) and to contain 960–990 mcg./mgm. of D(—)-α-aminobenzylpenicillin by bioassay.

*Example 6*

Aqueous solutions of 6-aminopenicillanic acid (6-APA) were prepared in water or in saturated aqueous sodium chloride to which there was added either one or four volumes acetone to make the final concentration of 6-aminopenicillanic acid from 2 to 40 mcg./ml. The solutions were then maintained with stirring at —40° C. to 0° C. and solid D(—)-2-phenylglycyl chloride hydrochloride (Cl-HCl) was added in two portions in an amount which gave a mole ratio of chloride hydrochloride to 6-APA of either 1.5 or 3.0. At the same time, where so indicated, triethylamine (TEA) was added in an amount equimolar to that used of chloride hydrochloride. After five or ten minutes shaking, the reaction products were adjusted to pH 7.0 and bioassayed to determine their content of D(—)-α-aminobenzylpenicillin, from which the percentage yield of the reaction was calculated. The conditions and results were as follows:

| Run No. | Conc'n 6-APA, mg./ml. | Conc'n NaCl | Temp., °C. | Equiv. Cl-HCl | TEA | Percent Acetone | Percent Yield |
|---|---|---|---|---|---|---|---|
| 1 | 10 | sat'd | —40 | 3 | yes | 80 | 53 |
| 3 | 40 | none | 0 | 3 | yes | 20 | 59 |
| 5 | 8 | sat'd | 0 | 3 | yes | 20 | 42 |
| 7 | 40 | sat'd | 0 | 1.5 | no | 20 | 40 |
| 9 | 40 | sat'd | —25 | 1.5 | yes | 20 | 61 |
| 11 | 8 | sat'd | —25 | 3 | no | 20 | 32 |
| 13 | 10 | sat'd | 0 | 3 | no | 80 | 70 |
| 15 | 2 | sat'd | —40 | 1.5 | no | 80 | 65 |
| 2 | 2 | sat'd | 0 | 1.5 | yes | 80 | 64 |
| 4 | 2 | none | —40 | 3 | yes | 80 | 67 |
| 6 | 8 | none | —4 | 1.5 | yes | 20 | 10 |
| 8 | 8 | none | 0 | 1.5 | no | 20 | 10 |
| 10 | 40 | none | —5 | 3 | no | 20 | 22 |
| 12 | 10 | none | 0 | 1.5 | yes | 80 | 75 |
| 14 | 2 | none | 0 | 3 | no | 80 | 65 |
| 16 | 10 | none | —40 | 1.5 | no | 80 | 61 |

It is apparent that the desired product was obtained in all cases. Thus, neither the use of added sodium chloride, nor the addition of triethylamine, nor the use of temperatures as low as —25° C., nor the use of the higher concentration of acetone were essential in themselves to high yields, but each of them when used did increase the yield, particularly if none of the others was used. The concentration of 6-APA was immaterial except that desirably high concentrations were effective. In like fashion, the molar excess of chloride hydrochloride was immaterial except that the more practical, smaller excess was quite effective.

*Example 7*

In two runs, 6-aminopenicillanic acid (0.5 g.) slurried in 100 ml. acetone and dissolved in a mixture of 50 ml. water, 2.5 g. NaCl and 50 ml. acetone was held at —40° C. during the addition in four increments of 1.0 g. solid D(—)-2-phenylglycyl chloride hydrochloride. There was also added to 2.5 ml. and 1.25 ml. 4N NaOH respectively. The yields of D(—)-α-aminobenzylpenicillin (as determined by bioassay on the reaction product after diluting it with water to 250 ml. at pH 6.0) were 16% for the anhydrous acetone run and 74% for the aqueous acetone run.

*Example 8*

(a) *2-(o-chlorophenyl)glycine.*—To a stirred solution of sodium cyanide (104.8 g.), ammonium carbonate (480 g.) in 1400 ml. water there was added all at once 200 g. ortho-chlorobenzaldehyde in 1400 ml. ethanol. After stirring about 16 hours at 30–50° C., charcoal was added to the dark solution and it was then filtered through diatomaceous earth (Supercel). After removal of the ethanol by distillation in vacuo, the aqueous solution was acidified to pH 2 to precipitate a crystalline solid which was collected by filtration after 30 minutes cooling, washed with water and saponified by refluxing for 24 hours in 1.2 l. of 10% NaOH. After adjusting the pH to 7 and cooling, the solid product, 2-(o-chlorophenyl)glycine, which precipitated was collected by filtration, dissolved in aqueous HCl, reprecipitated by adjusting the pH to 7, collected and found to weigh .61 g. and to decompose on heating at about 219° C.

(b) *2-(o-chlorophenyl)glycyl chloride hydrochloride.*—To 2-(o-chlorophenyl)glycine (17.1 g.) in 300 ml. $CH_2Cl_2$ at 0° C. there was added 27.4 g. $PCl_5$. The temperature rose to 15° C. and all solids went into solution. The product, 2-(o-chlorophenyl)glycyl chloride hydrochloride, soon began to precipitate and, after 15 minutes stirring, was collected by filtration, washed with ether and found to weight 17 g.

(c) *6 - [α - amino - o - chlorophenylacetamido]penicilanic acid; α-amino-o-chlorobenzylpenicillin.*—A solution was prepared by dissolving 14.4 g. 6-amino-penicillanic acid in 200 ml. water adjusted to pH 6.5 with 10% NaOH, adding 600 ml. acetone and then gradually lowering the pH to 2.5 by the addition of concentrated hydrochloric acid. To this solution at 0° C. there was added in small portions 17.1 g. 2-(o-chlorophenyl)glycyl chloride hydrochloride. The pH was kept at 2 by the addition of NaOH. The turbid mixture cleared to a solution. After addition of the acid chloride the solution was stirred 15 minutes, the pH was adjusted to 5.5 and the acetone was removed by distillation in vacuo to leave an aqueous residue from which a yellow solid was removed by filtration. The pH of the filtrate was lowered to 2 with dilute $H_2SO_4$ and it was extracted with methyl isobutyl ketone which was discarded. Then the aqueous phase was extracted with methyl isobutyl ketone (100 ml.) containing 22 g. bis(2-ethylhexyl)sodium sulfosuccinate (Aerosol OT). The methyl isobutyl ketone solution of the product, α-amino-o-chlorobenzylpenicillin, was dried over anhydrous $MgSO_4$. Adjustment of the pH to 5.5 with triethylamine precipitated the product as a solid which was collected by filtration and found to weigh 3.5 g. and to decompose slowly on heating above 180° C.

*Analysis.*—Calc'd for $C_{16}H_{18}ClN_3O_4S$: C, 49.9; H, 4.74. Found: C, 49.79; H, 5.83.

Example 9

(a) *2-(m-chlorophenyl)glycine.*—To a stirred suspension of sodium cyanide (104.8 g.) and ammonium carbonate (480 g.) in 1200 ml. water there was added a solution of m-chlorobenzaldehyde (200 g., 1.42 mole) in 1200 ml. ethanol. The mixture was stirred 10 hours at 50° C. and then cooled and stirred 48 hours at room temperature. While adding water, the ethanol and some water were removed by distillation in vacuo down to a volume of about 800 ml. That residual suspension was acidified with concentrated hydrochloric acid, giving a vigorous reaction. The mixture was then allowed to stand one hour and the solid was collected by filtration, washed with water, sucked dry on the filter and found to weigh 590 g. This material was dissolved on 2 liters 10% NaOH and refluxed 24 hours to give a solution to which carbon was added before filtering through diatomaceous earth (Supercel). The filtrate was adjusted to pH 7.2 with concentrated hydrochloric acid to precipitate the solid product which was collected by filtration, suspended in water and made alkaline with 10% NaOH. After removal of a small amount of insoluble material by filtration, the filtrate was acidified slowly with glacial acetic acid. The solids which precipitated at pH 9–10 were removed by filtration and discarded. The acidification was continued down to pH 7 to precipitate the product, 2-(m-chlorophenyl)-glycine, which was collected and dissolved as completely as possible by suspending them in water, adding 500 ml. concentrated hydrochloric acid and filtering. The filtrate was carefully adjusted back to pH 7 with 2 N NaOH. After chilling 3 hours at 40° F. the crystalline, precipitated product was collected, dried and found to weigh 100.9 g., M.P. 268–269° C. with decomposition.

(b) *2 - (m - chlorophenyl)glycyl chloride hydrochloride.*—2-(m-chlorophenyl)glycine (10 g., 0.0541 mole) and $PCl_5$ (14.6 g., 0.0703 mole) were mixed in 200 ml. chloroform at room temperature (23° C.) and 6 drops dimethylformamide were added. The reaction mixture was stirred overnight (16 hours) at room temperature (23° C.) and the precipitated product, 2-(m-chlorophenyl)glycol chloride hydrochloride, was collected by filtration on a hard, retentive filter paper, washed successively with $CCl_4$, $CH_2Cl_2$ and then mixed lower alkanes (Skellysolve B) and placed at once in a vacuum dessicator over $P_2O_5$. It weighed 5.0 g. and was used immediately to acylate 6-aminopenicillanic acid.

(c) *6 - (α - amino - m - chlorophenylacetamido)penicillanic acid; α-amino-m-chlorobenzylpenicillin.*—A suspension of 6-aminopenicillanic acid (3.02 g., 0.014 mole) in 60 ml. water was adjusted to pH 6.5 with 20% NaOH to give a solution. Acetone (240 ml.) was added and the solution was stirred and cooled to 0° to —5° C. The pH was then adjusted to 2.5 to 3.0 with 6 N HCl. The 2-(m-chlorophenyl)glycyl chloride hydrochloride (5 g., 0.0208 mole) was then added in small amounts over a period of about 10 minutes while maintaining the pH at 2.2 to 2.8 by the addition of 20% NaOH as needed. Stirring was continued for ten minutes. The pH was then adjusted to 4.5 with 20% NaOH and the acetone was removed by distillation in vacuo. The residual concentrate was filtered to remove a solid and chilled to 0 to 5° C.; the pH was 3.5. The pH was adjusted to 6.8 and the mixture was again filtered. The filtrate was covered with 75 ml. methyl isobutyl ketone, chilled to 0° to 5° C. and its pH was adjusted to 2 with 20% $H_2SO_4$. After filtration the methyl isobutyl ketone phase was separated and discarded. The aqueous phase was extracted with 40 ml. of methyl isobutyl ketone containing 2.0 g. bis(2-ethylhexyl)sodium sulfosuccinate (Aerosol OT). The organic solvent phase was separated, dried over $MgSO_4$, filtered and combined with 20 ml. additional methyl isobutyl ketone used to wash the filter-cake. Triethylamine was added dropwise to the filtrate until no more solid separated. The flocculent solid product, α-amino-m-chlorobenzylpenicillin, was collected by filtration, slurried twice in ether, dried in vacuo over $P_2O_5$ and found to weigh 690 mgm.

Example 10

(a) *p-Chlorophenylacetic acid.*—p-Chlorobenzyl cyanide (500 g., 3.3 mole) sulfuric acid (477 ml.) and water (625 ml.) were stirred under reflux for six hours. After cooling and allowing to stand overnight, a white crystalline mass of p-chlorophenylacetic acid precipitated. The water was decanted and the solid product was dissolved in 2.5 l. of warm 10 NaOH and extracted with ether. Acidification of the aqueous phase with concentrated hydrochloric acid reprecipitated the product which was collected, air-dried and found to weigh 732.5 g.

(b) *α-Bromo-p-chlorophenylacetic acid.*—The p-chlorophenylacetic acid prepared above (732.5 g.) was dissolved under reflux in 3 l. carbon tetrachloride. Bromine (184.5 ml., 3.6 mole) was added dropwise at a rate sufficient to maintain vigorous reflux which was maintained for 30 minutes after completion of the addition. After standing 12 hours and filtering to remove some solids, the solvent was removed by distillation in vacuo to leave the product, α-bromo-p-chlorophenylacetic acid, as a yellow crystalline solid which was washed with mixed lower alkanes (Skellysolve B) and recrystallized from 5 l. boiling Skellysolve B to give 732 g., M.P. 86–89° C.

(c) *α-Amino-p-chlorophenylacetic acid.*—To 150 ml. concentrated ammonium hydroxide stirred at 0° C. there was added 40 g. (0.161 mole) α-bromo-p-chlorophenylacetic acid. The mixture was stirred for 2 hours. After filtering, the filtrate was distilled in vacuo to reduce the volume and remove the excess ammonia. The resulting slurry was pH 6. After adding 50 ml. water, there was collected by filtration the solid product, α-amino-p-chlorophenylacetic acid, which was slurried in acid, air-dried and found to weigh 14.3 g., M.P. 257–259° C.

(d) *2-(p-chlorophenyl)glycyl chloride hydrochloride.*—To a stirred suspension cooled to —2° C. of 2-(p-chlorophenyl)glycine (18.6 g., 0.1 mole) in 250 ml. $CH_2Cl_2$ there was added in one portion 41.7 g., 0.2 mole, $PCl_5$, rinsing with 50 ml. $CH_2Cl_2$. After stirring 50 minutes at —2 to 0° C. there was added 2 ml. dimethylformamide and stirring was continued for 90 minutes at about 0° C. The product, 2-(p-chlorophenyl)glycyl chloride hydrochloride precipitated and was collected by filtration on a coarse, sintered funnel, washed twice with $CH_2Cl_2$, dried in vacuo over $P_2O_5$ and found to weigh 5.2 g.

(e) *6-[α-amino-(p - chlorophenyl)acetamido]penicillanic acid; α-amino-p-chlorobenzylpenicillin.*—6-aminopenicillanic acid (3.5 g., 0.016 mole) was suspended in 70 ml. water and dissolved by stirring and adjusting to pH to 6.5 with 10% NaOH. When solution was complete, 280 ml. acetone was added and the solution was cooled to —3° C. After quickly adjusting the pH to 2.5 with 6 N HCl there was added 5.2 g. (0.024 mole) of 2-(p-chlorophenyl)glycyl chloride hydrochloride in portions during 15 minutes while keeping the pH at 2–3 by the addition of 10% NaOH. The mixture was stirred 10 minutes at pH 2.6 and —2° C. and the pH was then raised to 4.5 with 10% NaOH and a moderate amount of precipitate was removed by filtration and discarded.

From the filtrate the acetone was removed by distillation in vacuo at 30 to 40° C.; two crops of precipitates were removed during this process and discarded. The residual aqueous solution was pH 2.5. It was cooled to 5° C., adjusted to pH 7, covered with methyl isobutyl ketone and the pH was adjusted to 2 with 6 N HCl. A small amount of solid was removed and discarded. The methyl isobutyl ketone phase was separated and discarded.

The colorless aqueous phase containing the product was extracted with a solution of 2.7 g. (0.006 mole) bis(2-ethylhexyl)sodium sulfosuccinate (Aerosol OT) in about 50 ml. methyl isobutyl ketone. The organic solvent phase was separated, filtered through anhydrous $Na_2SO_4$, concentrated slightly by distillation in vacuo and neutralized to pH 5.5 with triethylamine. The product, α-amino-p-chlorobenzylpenicillin, precipitated and was collected by filtration, slurried in ether, again collected, dried in vacuo over $P_2O_5$ and found to weigh 1.8 g. The product was then pulverized, slurried for 15 minutes with 40 ml. ether, filtered, dried and found to weigh 1.1. g.

*Example 11*

*D,L-α-amino-2,4-dichlorophenylacetyl chloride hydrochloride.*—A stirred suspension of 22.0 g. (0.1 mole) of D,L-α-amino-2,4-dichlorophenylacetic acid in 150 ml. of methylene chloride was cooled to −5° C. and 30.1 g. (0.15 mole) of phosphorus pentachloride was added in one portion. With protection from moisture by a calcium chloride tube the mixture was stirred for 3.5 hours at −8° to −5° C. After twenty minutes a solution was obtained, and from this there slowly separated a crystalline solid. This was collected by suction, washed four times with methylene chloride and dried in vacuo over phosphorus pentoxide.

Yield—18.2 g. (66%); M.P. 202–210° C. (decomposition; shrinks without melting from 175–202° C.). An infra-red curve showed a strong acid chloride band at 5.6 microns.

Analysis for $C_8H_7Cl_4NO$— Calcd. for Cl, 51.6; found: Cl, 51.6.

*6-(D,L-α-amino-2,4-dichlorophenylacetamido)penicillanic acid.*—The pH of a suspension of 9.5 g. (0.044 mole) of 6-aminopenicillanic acid in 200 ml. of water was adjusted to 6.3 with 10% sodium hydroxide and the resultant solution was diluted with 800 ml. of acetone and cooled to −3° C. The pH was lowered to 2.5 with 6 N hydrochloric acid and with vigorous stirring there was added during fifteen minutes 18.2 g. (0.066 mole) of D,L-α-amino-2,4-dichlorophenylacetyl chloride hydrochloride. After the addition of each increment the pH ws readjusted to 2 to 2.5 with 10% NaOH. The solution was stirred for five minutes, the pH was raised to 4.5 with 10% NaOH and the acetone was removed under reduced pressure at 30° C. The solid which separated was collected by filtration and the filtrate was cooled to 0–5° C. The pH was lowered to 2 with 20% sulfuric acid and the mixture extracted twice with methyl isobutyl ketone, the extracts being discarded. The clear aqueous solution was then extracted with a solution of 5.8 g. (0.013 mole) of Aerosol OT in 100 ml. of methyl isobutyl ketone. This extract was filtered through anhydrous sodium sulfate and concentrated in vacuo at 30° C. until all water was removed. It was then adjusted to pH 5 by addition of triethylamine. The solid which separated was collected, washed with ether and dried in vacuo over $P_2O_5$ as A. A second extraction of the aqueous solution with the same quantity of Aerosol OT, and subsequent treatment as above, gave solid B.

Weight of A—0.4 g. (2.2%); M.P. 162–166° C. (dec.). An infrared spectrum showed a β-lactam band at 5.8 microns. An infrared curve for fraction B showed no β-lactam.

Anal. for $C_{16}H_{18}CL_2N_3O_4S$—Calcd.: C, 45.80; H, 4.33. Found: C, 47.48; H, 5.03.

*Example 12*

*DL-α-amino-m-chlorophenylacetyl chloride hydrochloride.*—A suspension of 20 g. (0.108 mole) of DL-α-amino-m-chlorophenylacetic acid in 300 ml. of methylene chloride was chilled to −3°. Phosphorus pentachloride (29.2 g., 0.140 mole) was added and the mixture stirred for one-half hour during which time the temperature was allowed to rise to 2°. Dimethylformamide (8 drops) was added and the mixture stirred at 3° for 15 minutes. The finely divided solid was collected by filtration, washed once with methylene chloride and twice with Skellysolve B. The product was placed at once in a vacuum dessicator over phosphorus pentoxide and dried to constant weight; yield 17.4 g. (67.1%).

*6 - (α-amino - m - chlorophenylacetamido)penicillanic acid.*—6-Aminopenicillanic acid (10.2 g., 0.0472 mole) was suspended in 200 ml. of water. The pH was adjusted to 6.5 with 20% aqueous sodium hydroxide giving a clear solution. The solution was diluted with 800 ml. of acetone and chilled to −5° C. The pH was adjusted to 2.5 with 6 N hydrochloric acid. Powdered DL-α-amino-m-chlorophenylacetyl chloride hydrochloride (17 g., 0.0707 mole) was added in small portions over a period of 20 minutes. The pH was maintained in the range of 2.3–2.6 by the addition of 20% sodium hydroxide solution as needed. The reaction mixture was stirred for 10 minutes and then adjusted to pH 4.5 with 20% sodium hydroxide. The mixture was filtered to remove a quantity of crystalline solid.

The acetone was removed from the filtrate at reduced pressure using a rotary flash evaporator at a maximum temperature of 30°. During this operation a quantity of orange colored gum separated which was removed by filtration. The filtrate was adjusted to pH 7 with 20% sodium hydroxide and filtered.

The aqueous filtrate was layered with 75 ml. of methyl isobutyl ketone (MIBK), chilled to 5° C. and adjusted to pH 2 with 20% sulfuric acid. The MIBK phase was separated and discarded. The aqueous phase was extracted again with 75 ml. of MIBK, the MIBK phase being discarded.

A solution of 10.5 g. (0.0236 mole) of Aerosol OT in 100 ml. of MIBK was prepared. The solution was divided into three equal portions. The aqueous phase containing the crude penicillin was extracted in turn with each portion of Aerosol OT-MIBK solution the extracts being kept separate. Each extract was dried with anhydrous magnesium sulfate, filtered, and adjusted to approximately pH 5 with triethylamine. A gelatinous amorphous solid separated in each case. Each fraction of solid was collected by filtration, washed once with MIBK, three times with ether, and dried in vacuo over phosphorus pentoxide. The three fractions of crude penicillin were designated as I, II and III. The yields were as follows: fraction I, 1.9 g.; fraction II, 1.36 g.; fraction III, 1.0 g.

*Crystallization of 6-(α-amino - m - chlorophenylacetamido)penicillanic acid.*—Fraction II (1.26 g.) was suspended in 25 ml. of water and adjusted to pH 2 with 6 N hydrochloric acid. The mixture was filtered to remove insoluble material. The filtrate was diluted with an equal volume of methanol. The pH was adjusted to 4.3 with 20% sodium hydroxide. Scratching the walls of the flask with a glass rod induced the separation of crystalline material from the initially clear solution. After one-half hour the crop of crystalline material was collected by filtration and dried in vacuo over phosphorus pentoxide; yield 0.22 g., M.P. 198–204° C. (dec.).

*Analysis.*—Calcd. for $C_{16}H_{18}ClN_3O_4S$: C, 50.06; H, 4.73; N, 10.92. Found: C, 50.04; H, 4.85; N, 10.89.

We claim:

1. A process for the production of an α-aminobenzylpenicillin which comprises mixing about 1.0 to 3.0 moles (per mole of 6-aminopenicillanic acid) of a 2-phenylglycyl chloride hydrochloride selected from the group consisting of those compounds having the formula

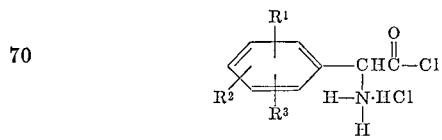

wherein $R^1$, $R^2$ and $R^3$ are each members selected from the group consisting of hydrogen, nitro, di(lower)alkylamino, (lower)alkanoylamino, (lower)alkyl, fluoro, chloro, bromo, iodo, (lower)alkoxy, (lower)alkylthio, (lower)alkylsulfonyl, sulfamyl, benzyl, phenethyl, cycloheptyl, cyclohexyl, cyclopentyl and trifluoromethyl and 6-aminopenicillanic acid in an aqueous medium maintained at about −50° C. to +20° C. and at a highly acidic pH to produce a solution of an α-aminobenzylpenicillin selected from the group consisting of those compounds having the formula

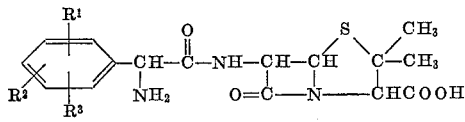

wherein R¹, R² and R³ have the meaning set forth above.

2. A process for the production of an α-aminobenzylpenicillin which comprises the step of adding in small increments about 1.1 to 1.5 moles (per mole of 6-aminopenicillanic acid) of a 2-phenylglycyl chloride hydrochloride selected from the group consisting of those compounds having the formula

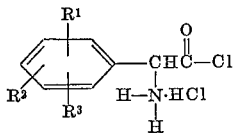

wherein R¹, R² and R³ are each members selected from the group consisting of hydrogen, nitro, di(lower)alkylamino, (lower)alkanoylamino, (lower)alkyl, fluoro, chloro, bromo, iodo, (lower)alkoxy, (lower)alkylthio, (lower)alkylsulfonyl, sulfamyl, benzyl, phenethyl, cycloheptyl, cyclohexyl, cyclopentyl and trifluoromethyl to an aqueous solution of 6-aminopenicillanic acid maintained at about −10° C. to +10° C. and at about pH 1.5–5.5 to produce a solution of an α-aminobenzylpenicillin selected from the group consisting of those compounds having the formula

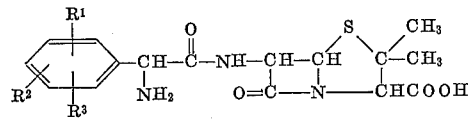

wherein R¹, R² and R³ have the meaning set forth above.

3. A process for the production of an α-aminobenzylpenicillin which comprises the step of adding in small increments about 1.1 to 1.5 moles (per mole of 6-aminopenicillanic acid) of a 2-phenylglycyl chloride hydrochloride selected from the group consisting of those compounds having the formula

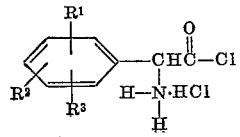

wherein R¹, R² and R³ are each members selected from the group consisting of hydrogen, nitro, di(lower)alkylamino, (lower)alkanoylamino, (lower)alkyl, fluoro, chloro, bromo, iodo, (lower)alkoxy, (lower)alkylthio, (lower)alkylsulfonyl, sulfamyl, benzyl, phenethyl, cycloheptyl, cyclohexyl, cyclopentyl and trifluoromethyl to a solution in aqueous acetone of 6-aminopenicillanic acid maintained at about 0° C. and at about pH 2–3 to produce a solution of an α-aminobenzlpenicillin selected from the group consisting of those compounds having the formula

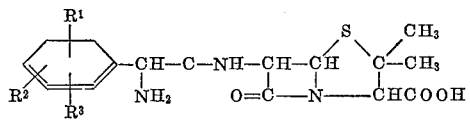

wherein R¹, R² and R³ have the meaning set forth above.

4. A process for the production of an α-aminochlorobenzylpenicillin which comprises mixing about 1.0 to 3.0 moles (per mole of 6-aminopenicillanic acid) of 2-(chlorophenyl)glycyl chloride hydrochloride and 6-aminopenicillanic acid in an aqueous medium maintained at about −50° C. to +20° C. and at a highly acidic pH to produce a solution of said α-aminochlorobenzylpenicillin.

5. A process for the production of D(−)-α-aminobenzylpenicillin which comprises mixing about 1.0 to 3.0 moles (per mole of 6-aminopenicillanic acid) of D(−)-2-phenylglycyl chloride hydrochloride and 6-aminopenicillanic acid in an aqueous medium maintained at about −50° C. to +20° C. and at a highly acidic pH to produce a solution of D(−)-α-aminobenzylpenicillin.

6. A process for the production of D(−)-α-aminobenzylpenicillin which comprises the step of adding in small increments about 1.0 to 1.5 moles (per mole of 6-aminopenicillanic acid) of D(−)-2-phenylglycyl chloride hydrochloride to an aqueous solution of 6-aminopenicillanic acid maintained at about −10° C. to +10° C. and at about pH 1.5–5.5 to produce a solution of D(−)-α-aminobenzylpenicillin.

7. A process for the production of D(−)-α-aminobenzylpenicillin which comprises the step of adding in small increments about 1.0 to 1.5 moles (per mole of 6-aminopenicillanic acid) of D(−)-2-phenylglycol chloride hydrochloride to a solution in aqueous acetone of 6-aminopenicillanic acid maintained at about 0° C. and at about pH 2–3 to produce a solution of D(−)-α-aminobenzylpenicillin.

References Cited in the file of this patent
UNITED STATES PATENTS 2,985,648 Doyle et al. _____ May 23, 1961
3,025,290 Doyle et al. _____ Mar. 13, 1962